United States Patent [19]
Haas et al.

[11] Patent Number: 6,142,115
[45] Date of Patent: Nov. 7, 2000

[54] VIBRATION DAMPER FOR THE CRANKSHAFT OF A PISTON ENGINE

[75] Inventors: Wolfgang Haas, Achern; Ruben Schmitt, Bühl; Friedrich Gerhardt, Kehl-Leutesheim; Wolfgang Reik, Bühl; Steffen Lehmann, Ettlingen; Willi Ruder, Lahr, all of Germany

[73] Assignee: Luk Lamellen und Kupplungsbau, GmbH, Buhl, Germany

[21] Appl. No.: 09/146,505

[22] Filed: Sep. 2, 1998

[30] Foreign Application Priority Data

Sep. 9, 1997 [DE] Germany .............................. 197 39 374

[51] Int. Cl.[7] .................................................. F02B 75/06
[52] U.S. Cl. ............................................ 123/192.1; 74/574
[58] Field of Search ........................... 123/192.1, 192.2; 74/574

[56] References Cited

U.S. PATENT DOCUMENTS

| | | | |
|---|---|---|---|
| 2,477,081 | 8/1949 | Pierce | 74/574 |
| 3,128,640 | 4/1964 | Zeidler | 74/574 |
| 3,196,710 | 7/1965 | Pierce | 74/574 |
| 3,296,887 | 1/1967 | Larsen | 74/574 |
| 3,628,353 | 12/1971 | Armstrong | 74/574 |
| 4,274,524 | 6/1981 | Nakane | 74/574 |
| 4,468,207 | 8/1984 | Yoshida | 74/574 |
| 4,908,003 | 3/1990 | Kobayashi et al. | 74/574 |
| 5,151,065 | 9/1992 | Maucher et al. | 74/574 |
| 5,374,218 | 12/1994 | Reik et al. | |

FOREIGN PATENT DOCUMENTS

| | | |
|---|---|---|
| 40 25 848 A 1 | 2/1992 | Germany . |
| 195 19 261 A 1 | 12/1996 | Germany . |

*Primary Examiner*—Noah P. Kamen
*Attorney, Agent, or Firm*—Darby & Darby

[57] ABSTRACT

The crankshaft of a piston engine is assembled with a vibration damper into a discrete module prior to mounting of such module in axial and/or radial bearings of the housing of the engine. The damper has an input element which rotates with the camshaft and a mass which is angularly movable relative to the input element against the resistance of coil springs. The input element can be provided with a sleeve which surrounds a snout at one axial end of the crankshaft. Alternatively, the damper can be installed in or on or can constitute a cheek of the crankshaft. The coil springs can operate in parallel with a friction generating device which also opposes rotation of the input element and the mass of the damper relative to each other.

41 Claims, 5 Drawing Sheets

Fig. 7

Fig. 6

VIBRATION DAMPER FOR THE CRANKSHAFT OF A PISTON ENGINE

BACKGROUND OF THE INVENTION

The invention relates to improvements in piston engines (also known as reciprocating or displacement engines), and more particularly to improvements in methods of and means for preventing or reducing the extent and/or frequency of stray movements of crankshafts in such engines. Still more particularly, the invention relates to improvements in the construction and mounting of vibration dampers for the crankshafts of piston engines.

Published German patent application Serial No. 195 19 261 discloses a torsional vibration damper which comprises an annular casing adapted to be connected to the shaft of a machine and confining a flywheel which is rotatable relative to the casing against the opposition of a body of viscous fluid. This published application proposes to position the casing of the vibration damper at the front end face of, and to fasten the casing to, the front end (snout) of the crankshaft. A drawback of such proposal is that the thus attached damper occupies a substantial amount of space which is not always available under the hoods of certain types of motor vehicles (such as compact cars), especially if the engine is installed transversely of the direction of forward movement of the conveyance.

Published German patent application Serial No. 40 25 848 discloses a modified vibration damper which is intended for use in piston engines and employs annular flywheels as well as a hub which is to be secured to the crankshaft of the engine. The annular flywheels are movably secured to the hub by buffers of rubber or other suitable elastomeric material. The hub is provided with or carries a pulley for one or more endless belts serving to transmit motion to the camshaft of the engine and/or to one or more auxiliary aggregates of the motor vehicle.

One of the purposes of vibration dampers for the crankshafts of piston engines is to suppress the characteristic frequencies (harmonic vibrations) of the crankshafts. In many instances, the characteristic frequency of the crankshaft in the housing of a piston engine is in the range of between 300 and 450 Hz. Such frequency is induced primarily as a result of iregularities attributable to compression and expansion that take place in the cylinders for the pistons of the engine. Vibrations at the torsional resonancy can result in breakage of the crankshaft, and this is the reason that the crankshafts of piston engines are normally equipped with vibration dampers (e.g., in the form of heavy, rubber-mounted wheels in front of the crankshaft) to counter harmonic vibrations.

In order to achieve a satisfactory vibration damping action, the vibration damping frequency must be selected with a rather high degree of accuracy. As already mentioned above, presently known attempts at adequate damping of vibrations of a crankshaft in a piston engine include the provision of at least one annular flywheel which is movably connected to a hub or another input element of the vibration damper by a buffer of rubber (or other energy-storing elastomeric material), or by a body of oil or another suitable viscous fluid.

In addition to their often excessive space requirements, the aforediscussed presently known vibration dampers for the crankshafts of piston engines exhibit the drawback that the viscosity of fluid can be greatly influenced by changes of temperature and that such temperature changes can also exert an undue influence upon the spring gradient of the elastomeric material. It is to be borne in mind that a vibration damper for the crankshaft of a piston engine is installed in immediate or very close proximity to one or more sources of pronounced heat. Attempts to overcome or to reduce the undesirable influence of elevated temperatures upon the predictability and reliability of operation of conventional vibration dampers for crankshafts include the utilization of oversized vibration damping masses to thus widen the frequency range within which the damper is or should be effective. However, the utilization of oversized masses brings about other serious problems and drawbacks such as a greatly increased fuel consumption and an increased resistance of rotary components of the piston engine to the setting in rotary motion.

OBJECTS OF THE INVENTION

An object of the invention is to provide a vibration damper which can be utilized with the crankshaft of a piston engine and is less affected by temperature changes and/or elevated temperatures than heretofore known vibration dampers for crankshafts.

Another object of the invention is to provide a vibration damper which can stand pronounced thermal stresses for exended periods of time.

A further object of the invention is to provide a vibration damper which is constructed and assembled and which can be installed in a piston engine in such a way that it can effectively counter harmonic vibrations of a crankshaft during each stage of operation of the piston engine.

An additional object of the invention is to provide a novel and improved crankshaft-vibration damper combination which is not affected, or not appreciably affected, by pronounced temperature changes and which can be utilized in lieu of and as a superior substitute for conventional crankshaft-vibration damper combinations.

Still another object of the invention is to provide a novel and improved method of assembling a piston engine wherein the crankshaft is prevented from carrying out any, or from carrying out excessive, harmonic vibrations.

A further object of the invention is to provide a novel and improved module which embodies a crankshaft and can be utilized in piston engines as a superior substitute for conventional crankshaft-vibration damper combinations.

Another object of the invention is to design a vibration damper for the crankshaft of a piston engine in such a way that the range of thermal influence upon the frequency range in which the vibration damper is effective is much narrower than in connection with the utilization of conventional vibration dampers for the crankshafts of piston engines.

An additional object of the invention is to provide a simple, compact and inexpensive but highly effective vibration damper which can be put to use in all or nearly all types of piston engines to oppose stray movements of the crankshaft.

Still another object of the invention is to provide a damper which can be readily installed in the housing of a piston engine.

A further object of the invention is to provide a piston engine which embodies one or more dampers of the above outlined character.

Another object of the invention is to provide a piston engine with a novel and improved housing for the crankshaft and for a damper which serves to counter harmonic vibrations of the crankshaft.

An additional object of the invention is to provide a motor vehicle embodying a piston engine which utilizes the above outlined crankshaft-vibration damper combination.

Still another object of the invention is to provide a piston engine wherein the vibration damper for the crankshaft need not be provided with a discrete lubricating system.

SUMMARY OF THE INVENTION

One feature of the present invention resides in the provision of a piston engine which comprises a housing, a crankshaft which is rotatably journalled in the housing, and means for damping vibrations of the crankshaft. The damping means is at least partially confined in the housing and is provided on the crankshaft.

In accordance with a presently preferred embodiment, the damping means is fully or practically fully confined in the housing of the piston engine.

A presently preferred embodiment of the damping means comprises a first component including a rotary input element and a second component including at least one rotary inertia-enhancing mass. The input element and the at least one mass are rotatable relative to each other, and the damping means further comprises energy storing resilient means interposed between the input element and the at least one mass to oppose rotation of the input element and the at least one mass relative to each other. The energy storing resilient means can comprise one or more coil springs, and the piston engine can further comprise at least one friction generating device which is installed to oppose at least certain stages of rotation of the input element and the at least one mass relative to each other.

It is possible to utilize the friction generating device(s) in lieu of the energy storing resilient element or elements.

The damping means can be mounted on or in or adjacent a cheek or web of the crankshaft. For example, the damping means can be located adjacent a cheek as seen in the axial direction of the crankshaft.

The damping means can include or constitute a ring which is concentric with a portion of the crankshaft, for example, with an end portion referred to as snout.

A cheek of the crankshaft can be positioned adjacent to but still spaced apart from a wall of the housing (as seen in the axial direction of the crankshaft), and the damping means can be disposed in the housing between such cheek and the wall. The crankshaft can comprise a portion (such as the aforementioned snout) which is rotatably mounted in the wall.

The aforementioned input element of the damping means is rotatable with the crankshaft; the input element can be fixed to the shaft by a suitable form-locking connection or permanently, e.g., by welding.

The damping means or the piston engine can further comprise means for limiting the magnitude of torque which the crankshaft can transmit to the input element of the damping means. For example, the torque limiting means can comprise one or more slip clutches.

The input element of the damping means can constitute a rotary annular body and the mass of the damping means can be designed and mounted in such a way that it is adjacent at least one side of the annular input element (as seen in the axial direction of the crankshaft). The mass and the input element are rotatable relative to each other against the opposition of the aforementioned resilient energy storing element or elements. If provided, a friction generating device can be installed to operate between the input element and the mass; such friction generating device can operate in parallel with the energy storing element(s).

If the mass comprises several discrete portions, e.g., two discrete portions, such discrete portions can be located at opposite sides of the annular input element of the damping means and can be spaced apart from each other in the axial direction of the crankshaft. Each energy storing element of the damping means is preferably installed in windows which are provided therefor in the input element and in at least one portion of the mass to oppose rotation of the input element and the at least one portion of the mass relative to each other. Such damping means preferably further comprises means (e.g., rivets) for non-rotatably connecting the portions of the mass to each other. As already mentioned hereinbefore, it is presently preferred to employ energy storing resilient elements in the form of coil springs, and each portion of the mass can but need not have an annular shape. If the just described embodiment of the damping means employs at least one friction generating device which serves to oppose rotation of the mass and the input element relative to each other (e.g., in parallel with the coil spring or springs), the friction generating device can comprise at least one energy storing member (e.g., a diaphragm spring or a corrugated washer-like spring) which reacts against the mass or against the input element and bears upon the input element or the mass.

The input element of the damping means can be provided with a tubular extension which surrounds an end portion of the crankshaft, such as the aforementioned snout. The extension is preferably located radially inwardly of the resilient energy storing element or elements of the damping means. It is possible to design the extension in such a way that it constitutes an axial and/or a radial bearing for the end portion of the crankshaft in the housing.

Another feature of the invention resides in the provision of a vibration damper which can be utilized in a piston engine having a housing and a crankshaft which is rotatable relative to the housing by one or more connecting rods receiving motion from pistons, and which serves to transmit torque to (or which constitutes) the rotary output element of the engine, e.g., an output element which can transmit torque to a friction clutch in the power train of a motor vehicle. The crankshaft and the vibration damper constitute a module which is ready to be rotatably mounted in the housing of the piston engine.

The damper can be designed in such a way that it includes a portion which surrounds an end portion of the crankshaft.

The input and output elements of the vibration damper forming part of the module can be immediately adjacent a cheek or web of the crankshaft.

Alternatively, a cheek of the crankshaft can be constituted (either entirely or in part) by the vibration damper of the module.

The damper can constitute an annular or a substantially U-shaped (such as horseshoe-shaped) structure.

The crankshaft can be designed in such a way that it includes a cheek and an oval or substantially oval portion adjacent the cheek. Such oval portion can extend radially of the rotational axis of the crankshaft and it can be flanked by two surfaces which are at least substantially normal to such axis. The damper has a substantially U-shaped outline, it surrounds the oval portion, and includes two legs which at least partially abut the cheek. Fastener means (e.g., bolts or screws) is provided to reliably connect the legs of the damper to the cheek; alternatively, the damper can be permanently affixed (e.g., welded) to the cheek.

A further feature of the invention resides in the provision of a method of assembling a piston engine wherein a crankshaft is rotatable in a housing and has a tendency to perform at times harmonic vibrations in actual use of the engine. The method comprises the steps of assembling the crankshaft and at least one vibration damper into a module, and thereupon rotatably mounting the crankshaft of the thus obtained module in the housing.

The assembling step can include incorporating the at least one vibration damper into a cheek of the crankshaft.

The assembling step can also include combining the crankshaft with a plurality of identical or different vibration dampers.

The novel features which are considered as characteristic of the invention are set forth in particular in the appended claims. The improved vibration damper itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
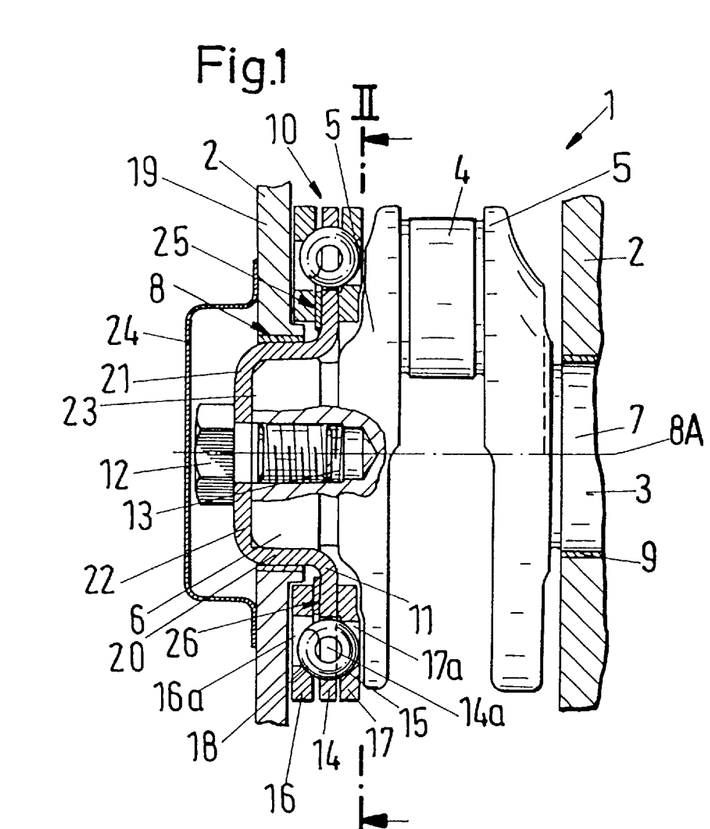
FIG. 1 is a fragmentary partly elevational and partly axial sectional view of the housing and the crankshaft of a piston engine wherein the harmonic vibrations of the crankshaft can be opposed by a damper which embodies one form of the present invention.
Figure 2:
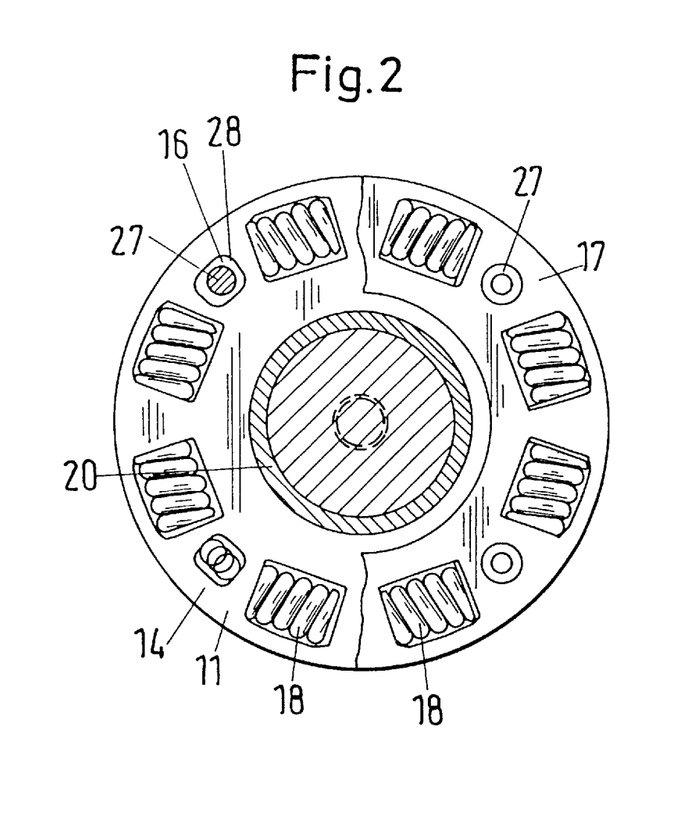
FIG. 2 is a transverse sectional view substantially as seen in the direction of arrows from the line II—II in FIG. 1.

FIGS. 1 and 2 show certain details of a prime mover 1 which is an internal combustion engine, and more specifically a piston engine (also called reciprocating or displacement engine and hereinafter called engine or piston engine) adapted to be put to use in the power train of a motor vehicle. As a rule, the output member (namely the rotary crankshaft 3 of the engine 1 shown in FIGS. 1 and 2) transmits torque to the input element (not shown) of a torque transmitting system (such as a driver-operated or automated or automatic clutch) which, in turn, transmits torque to the input element of a manually or automatically shiftable change-speed transmission. Reference may be had, for example, to commonly owned U.S. Pat. No. 5,374,218 granted Dec. 20, 1993 to Wolfgang Reik et al. for "APPARATUS FOR COMPENSATION OF FLUCTUATIONS OF TORQUE" which shows (only schematically) a combustion engine and a transmission as well as the details of a friction clutch which transmits torque from the rotary output element of the engine to the rotary input element of the transmission.

The crankshaft 3 is rotatably journalled in a housing 2 of the engine 1 and comprises one or more crankpins 4 (only one shown in FIG. 1). In a manner well known from the art of piston engines, each crankpin is orbited about the axis 8A of the crankshaft 3 by a discrete connecting rod which is connected to a reciprocable piston of the engine. As concerns the construction and mode of operation of piston engines, reference may be had, for example, to pages 80–87 of the German-language "Taschenbuch für den Maschinenbau" (18th Edition) by Dubbel and/or to pages 382–399 of the German-language "Kraftfahrtechnisches Taschenbuch" (22nd Edition) published by Bosch and/or to "Modern Automotive Technology" by James E. Duffy (1994 Edition, published by The Goodheart-Willcox Company, Inc., Tinley Park, Ill.).

The disclosures of all patents and other publications, as well as of all patent applications (including the parent German patent application Ser. No. 197 39 374.8 filed Sep. 9, 1997)) which are identified in this specification are incorporated herein by reference.

The crankpin 4 which is shown in FIG. 1 is flanked by two cheeks 5. The right-hand cheek 5 transmits rotary motion to a bearing journal 7 (e.g., a main bearing journal at one axial end of the crankshaft 3) which is rotatable in a sleeve-like radial bearing 9 mounted in the housing 2. The left-hand cheek 5 of FIG. 1 is of one piece with or is connected to the front end (also called snout) 6 of the crankshaft 3, and this snout is indirectly mounted in a sleeve-like radial bearing 8 which, in turn, is installed in a radially extending wall 19 of the housing 2. The axes of the bearings 8, 9 coincide with the axis 8A of the crankshaft 3.

It is clear that the illustrated bearing 8 and/or 9 can be replaced with an antifriction roller bearing having an inner race, an outer race and at least one annulus of spherical and/or other rolling elements between the two races. Furthermore, if the crankshaft 3 comprises two or more crankpins 4, it comprises two or more bearing journals (corresponding to the journal 7) and at least one additional journal can be mounted in the housing 2 by way of a sleeve bearing or another suitable friction reducing bearing. For example, the bearing journals which are separated from each other by sets of two or three crankpins can be rotatably mounted in the housing of the piston engine.

The housing 2 contains a vibration damper 10 which comprises a first component including an input element 11 rigidly (non-rotatably) affixed to the snout 6 by a threaded fastener 12. The illustrated fastener 12 is a bolt having an externally threaded shank received in a tapped bore 13 of the snout 6 in such a way that the axis of the properly inserted fastener coincides with the axis 8A of the crankshaft 3. However, the input element 11 can be non-rotatably secured to the crankshaft 3 in a number of other ways. For example, it is possible to resort to a form-locking connection including a profiled portion of the input element 11 which is caused to receive or surround a complementary profiled portion of the crankshaft. Alternatively, the input element 11 (or an equivalent input element) can be pinned or bonded to the crankshaft. The bonding operation can involve pressure welding, resistance pressure welding, resistance fusion welding, radiation welding, inert gas arc welding or fusion welding. Reference may be had to pages G4–G7 of the aforementioned German-language publication "Taschenbuch für den Maschinenbau" (18th Edition) by Dubbel.

The input element 11 of the damper 10 which is shown in FIGS. 1 and 2 comprises an annular (washer-like) radially outer portion 14 which is flanked by and indirectly supports a second component including two ring-shaped portions 16, 17 of a flywheel or mass 15. The radially outer portion of the left-hand cheek 5 of FIG. 1 is configurated in such a way that it provides room for confinement of the radially outer portion 14 of the input element 11 and of the portions 16, 17 of the mass 15 between this cheek and the radial wall 19 of the housing 2. More specifically, the left-hand cheek 5 of FIG. 5 is configurated to provide room for the adjacent portion 17 of the mass 15.

The portion 14 of the input element 11 and the portions 16, 17 of the mass 15 are provided with at least partially registering windows 14a, 16a, 17a which extend in the circumferential direction of the mass 15 (see FIG. 2), and each such set of at least partially registering windows receives portions of a discrete energy storing element 18 in the form of a coil spring, preferably a steel spring. The springs 18 oppose rotation of the input element 11 and the mass 15 relative to each other.

The input element 11 serves as a means for centering the entire damper 10 on the snout 6 of the crankshaft 3, at least in a direction as seen radially of the axis 8A. To this end, the radially inner portion of the input element 11 comprises a sleeve-like tubular extension 20 which surrounds the snout 6 radially inwardly of the annular portion 11 and forms part of a cupped member 21 further including an end wall 22 abutting the adjacent end face 23 of the snout 6 under the action of the head of the fastener 12. It is preferred to configurate the extension 20 in such a way that it snugly receives the snout 6.

The tubular extension 20 is directly surrounded by the sleeve-like radial bearing 8 which is mounted in the wall 19 of the housing 2. The bearing 8 can rotate with the extension 20 relative to the wall 19, or the extension 20 can rotate relative to the bearing 8. At least one of the bearings 8, 9 can be designed as a combined radial and thrust bearing to hold the crankshaft 3 and the damper 10 against axial movement relative to the housing 2.

FIG. 1 shows that the damper 10 is mounted at the free end (snout 6) of the crankshaft 3, i.e., at the end which is remote from the torque transmitting end of the crankshaft. Such torque tranmitting end (constituted by the bearing journal 7 or a bearing journal (not shown) to the right of the journal 7) constitutes the rotary output element of the engine 1 and can transmit torque to the input element (such as a flywheel) of the aforemntioned torque transmitting system (e.g., a friction clutch) which, in turn is engageable or disengageable to transmit, or to interrupt the transmission of, torque to the input element of a change-speed transmission in the power train of a motor vehicle. Reference may be had again to U.S. Pat. No. 5,374,218 to Reik et al.

The damper 10 (or an equivalent damper) can be installed in the housing 2 to the right of the right-hand cheek 5 shown in FIG. 1 or at the very output end of the crankshaft 3. It is also possible to install one or more dampers in the housing of a piston engine adjacent an intermediate portion of the crankshaft. Still further, and particularly if the crankshaft is a so-called composite crankshaft, the housing of the engine can confine two or more dampers, e.g., two dampers adjacent different pairs of cheeks of the composite crankshaft.

The bearing 8, the cupped portion 21 of the input element 11 and the fastener 12 are sealed from the surrounding atmosphere by a cover or closure 24 having a radially extending outer portion which is sealingly secured to the outer side of the wall 19. FIG. 1 shows that the closure 24 is bonded to the wall 19. However, it is also possible to secure the closure 24 to the housing 2 by means of suitable fasteners (screws, bolts or the like, not shown); it is then advisable to install a washer or another suitable sealing element between the housing 2 and the closure 24 (or another reliable closure). The closure 24 prevents the escape of lubricant for the crankshaft 3 and the damper 10 from the housing 2.

The housing 2 further confines a hysteresis or frictional damping device 25 which operates in parallel with the coil springs 18 of the damper 10. The damping device 25 which is shown in FIG. 1 comprises an energy storing member 26, such as a diaphragm spring, which is installed in prestressed condition to react against the annular portion 14 of the input member 11 radially inwardly of the coil springs 18, and to act (in the direction of the axis 8A) against the adjacent side of the portion 16 of the two-piece mass 15.

The portions 16, 17 of the mass 15 are fixedly secured to each other by distancing elements in the form of rivets 27 which alternate with pairs of coil springs 18 (as seen in the circumferential direction of the damper 10) and extend (preferably with a predetermined clearance) through openings 28 of the annular portion 14 of the input element 11. The rivets 27 ensure that the diaphragm spring 26 of the damping device 25 can urge the left-hand side (as viewed in FIG. 1) of the portion 17 of the mass 15 against the right-hand side of the annular portion 11. In other words, the rivets 27 ensure that, since the portion 16 is in indirect frictional engagement with the annular portion 14 by way of the diaphragm spring 26, the portion 17 is in direct frictional engagement with the portion 14.

The rivets 27 and the surfaces bounding the respective openings 28 in the portion 14 of the input element 11 further serve as a means for limiting the extent of angular movability of the input element 11 and the mass 15 relative to each other. Of course, it is equally possible to rely on other modes of limiting the extent of angular movement of the parts 11 and 15 of the damper 10 relative to each other (in addition to or in lieu of accurate dimensioning of the openings 28 for the shanks of the rivets 27). For example, the angular movability of the parts 11, 15 relative to each other can be limited by the coil springs 18; such angular movability is terminated when the neighboring convolutions of the coil springs 18 are caused to abut each other, i.e., when the coil springs begin to act as solid blocks or bodies (as seen in the circumferential direction of the damper 10).

The axial dimensions of the piston engine 1 can be reduced by replacing the illustrated threaded fastener 12 with one or more countersunk screws (not shown).

Furthermore, a discrete radial bearing 8 can be omitted by providing the external surface of the extension 20 of the input element 11 with one or more coats of a suitable wear-resistant friction reducing material. It is also advisable to harden the extension 20, either in its entirety or at least along its external surface. For example, one can resort to an inductive or radiation hardening procedure.

The parts 11, 16 and 17 of the damper 10 which is shown in FIG. 1 are made of a suitable metallic sheet material. An advantage of such construction is that the entire damper occupies a minimal amount of space as seen in the direction of the axis 8A and can be readily confined between the left-hand cheek 5 of FIG. 1 and the wall 19 of the housing 2. The making of the parts 11, 16 and 17 of a metallic sheet material contributes to simplicity of manufacture and lower cost of the damper 10 as well as to lower cost of the entire piston engine.

The basic function of the damper 10 is carried out by the mass 15 in conjunction with the coil springs 18. These springs can be installed in a partially stressed condition. It has been found that the damper 10 operates quite satisfactorily if the springs 18 are prestressed to an extent corresponding to about 50% of the maxium possible stress. However, the initial stress can be more or less than 50%. Another advantage of initial stressing of the springs 18 is that the mass 15 is not likely to oscillate relative to the input element 11 of the damper 10, i.e., that, under normal circumstances, there is no play or no undue play between the input element 11 and the portions 16, 17 of the mass 15.

The initial stressing of the coil springs 18 and the dimensions of the windows 14a, 16a, 17a can be selected in such a way that the damper 10 can carry out its function in several successive stages. This can be readily accomplished by selecting the dimensions of the windows and the initial stressing of the springs 18 in such a way that a first set of springs begins to offer a resistance to angular displacement of the input element 11 and mass 15 right from the start, and that at least one further set of springs 18 begins to offer a resistance to such angular displacements after the input element 11 and the mass 15 have already completed a certain initial angular movement relative to each other. The number of stages can be one, two or more than two.

It is further possible to select the energy which is stored by the springs 18 and the mass 15 in such a way that the damping frequency corresponds or is properly related to the characteristic frequency of the crankshaft 3.

The frictional damping device 25 can be used jointly with or in lieu of or can be replaced by a velocity-dependent or velocity-proportional damping by means of oil or another viscous fluid in one or more gaps between parts which are caused to move relative to each other. For example, a velocity-proportional damping action can be arrived at by selecting a correspondingly narrow or wide gap or clearance between at least one of the annular portions 16, 17 of the mass 15 and the annular radially outer portion 14 of the input element 11.

An important advantage of the feature that the damper 10 is installed in the housing 2 of the engine 1 is that the lubricating system for the crankshaft and/or certain other parts of the engine can also serve as a means for lubricating the damper 10 as well as to establish the aforediscussed velocity-dependent damping through one or more properly dimensioned gaps between the input element 11 and the mass 15 of the damper 10. Still further, such lubricant can serve as a means for withdrawing heat from the parts of the damper 10.

Adequate lubrication of and withdrawal of heat from the constituents of the damper 10 is highly importaant because this entails a much less pronounced wear upon the neighboring parts which are in contact with and move relative to each other and hence a longer useful life of the entire piston engine.

An advantage of coil springs (18) which consist of steel (rather than another metallic or a plastic material) is that the spring characteristics of such energy storing elements are not affected, or not overly affected, by pronounced temperature changes. This, in turn, brings about the important advantage that the damper frequency and/or the range of damper frequencies can be selected with a high degree of accuracy and remains at least substantially unchanged in actual use of the piston engine. Therefore, it is possible to employ a relatively small damper having a relatively small mass, i.e., the improved damper 10 is surprisingly compact. Moreover, such damper can readily stand elevated temperatures (such as up to 130° C.) which develop or are likely to develop in actual use of the engine 1.

Figure 3:
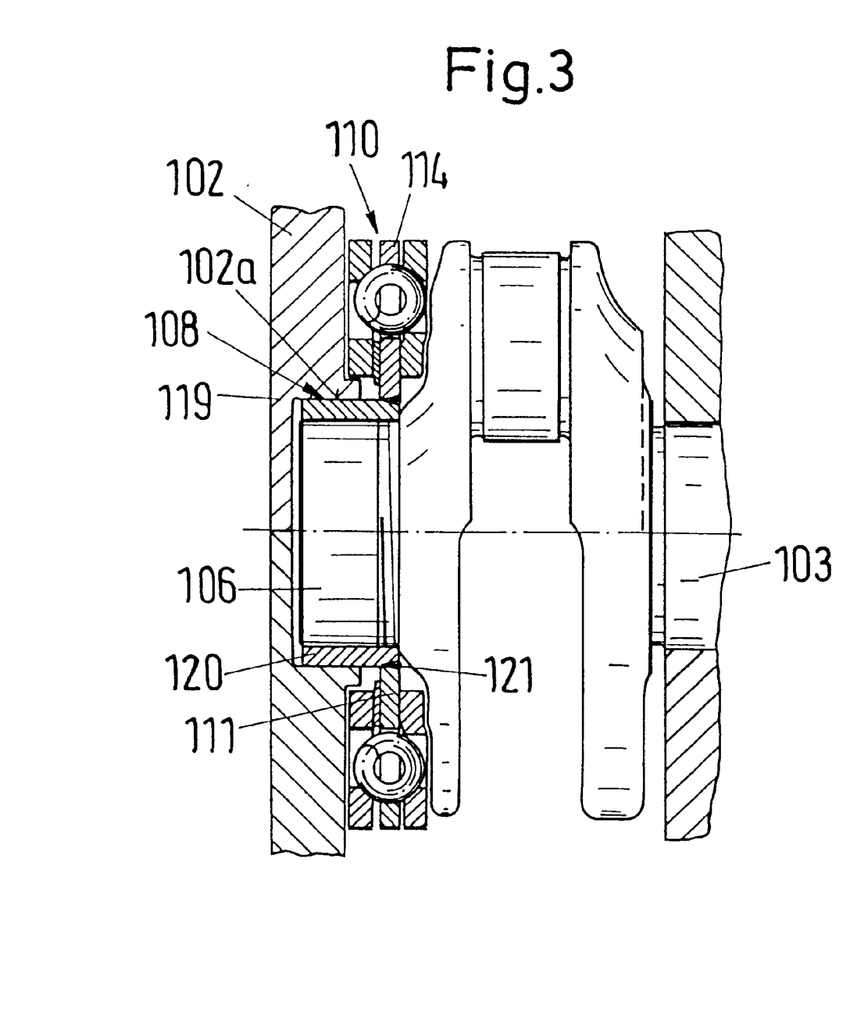
FIG. 3 is a fragmentary partly elevational and partly axial sectional view similar to that shown in FIG. 1 but depicting a modified crankshaft and a modified vibration damper for the crankshaft.

FIG. 3 illustrates a portion of a second piston engine wherein the length of the housing 102 (as seen in the axial direction of the crankshaft 103) is less than the length of the housing 2 in the piston engine 1 of FIGS. 1 and 2. One of the reasons is that the input element 111 of the vibration damper 110 which is shown in FIG. 3 is assembled of two separately produced parts, namely a washer-like annular radially outer portion 111 and a centrally located cylindrical sleeve-like part 120. The latter is welded (as at 121) to the radially innermost part of an annular portion 114 to constitute a functional equivalent of the extension 20 of the input element 11 in the damper 10 of FIGS. 1 and 2. The part 120 can be said to constitute a radial bearing which surrounds the snout 106 of the crankshaft 103 and extends into a blind bore or recess 102a in the radially extending wall 119 of the housing 102.

The connection 121 between the parts 114 and 120 of the input element 111 of the damper 110 is preferably established by laser beam welding. However, it also possible to resort to any other of the aforementioned welding techniques.

An important advantage of the method of assembling the input element 111 of two separately produced parts 114, 120 is that the internal and/or external surface of the cylindrical part 120 can be readily finished with a desirable high degree of precision (e.g., at the exterior of the part 120 to thus obtain a highly satisfactory radial bearing 108). The cylindrical part 120 can be a press fit on the snout 106 of the crankshaft 103 and a precise sliding fit in the blind bore 102a of the wall 119. For example, the part 120 can be shrunk onto the snout 106. However, it is equally within the purview of the invention to non-rotatably secure the cylindrical part 120 to the snout 106 in any other suitable way, e.g., in accordance with any one of the procedures already described in connection with the mounting of the extension 20 on the snout 6 of the crankshaft 3 shown in FIGS. 1 and 2. By way of example only, at least the internal surface of the cylindrical part 120 can be facetted and can non-rotatably surround a facetted complementary external surface of the snout 106.

It is also possible to provide a radial bearing 108 which includes one or more layers of friction reducing wear-resistant material applied to the external surface of the part 120 and/or to the surface surrounding the blind bore 102a. Still further, it is possible to employ a separately produced sleeve-like radial bearing (corresponding to the sleeve 8) which is inserted between the part 120 and the surrounding portion of the wall 102. Still further, it is possible to select the diameter of the blind bore 102a in such a way that the internal surface surrounding such bore and the external surface of the part 120 provide room for a radial or combined radial and axial antifriction bearing with inner and outer races and one or more annuli of spherical and/or other rolling elements between the two races.

Another advantage of the embodiment a portion of which is illustrated in FIG. 3 is that the closure or cover 24 of FIG.

1 can be dispensed with. This entails savings in material and labor and contributes to compactness of the piston engine (as seen in the axial direction of the crankshaft 103).

Each of the housings 2 and 102 can be assembled of two or more separately produced parts. For example, the housing 2 of the piston engine 1 can be assembled of at least two separately produced parts which are fixedly and sealingly secured to each other in the region of the crankpin 4.

Figure 4:
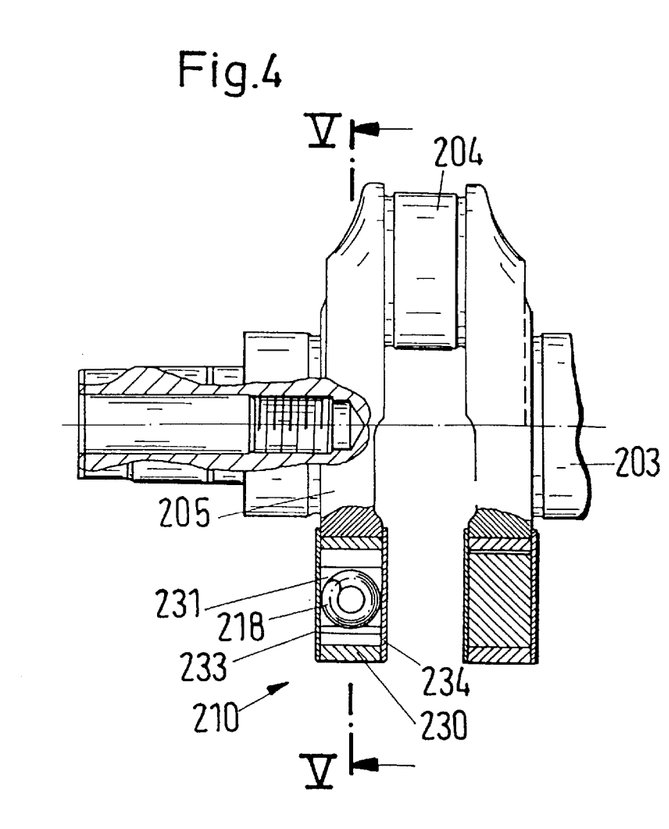
FIG. 4 is a fragmentary partly elevational and partly sectional view of a piston engine embodying a different crankshaft-vibration damper combination, with the damper attached to and partially surrounding one cheek of the crankshaft.
Figure 5:
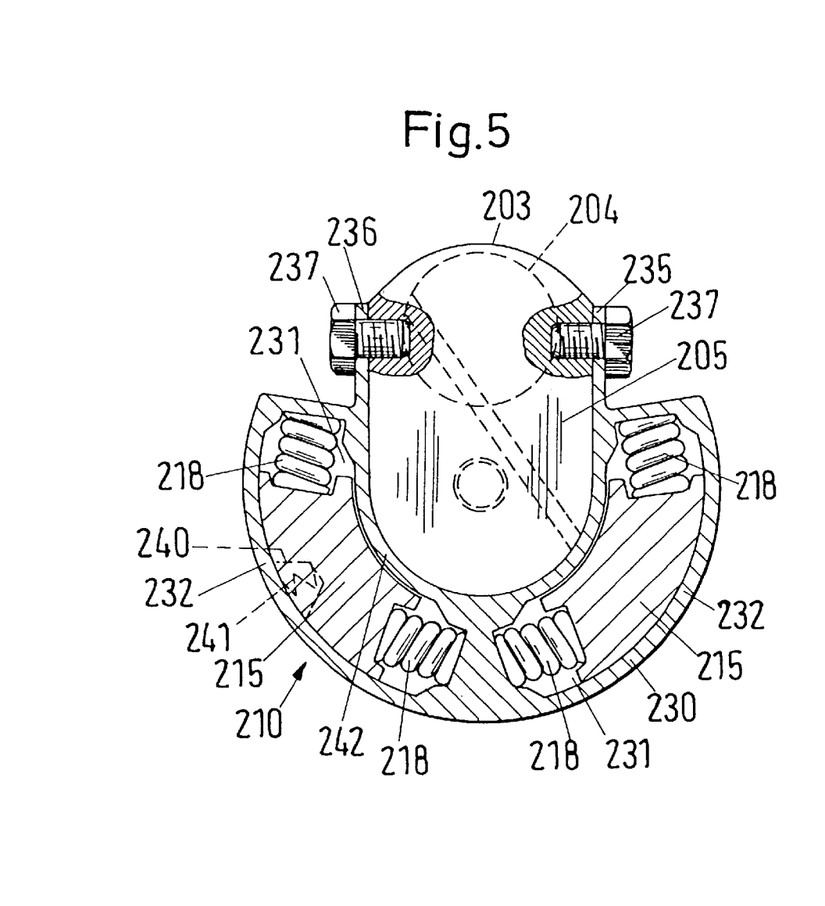
FIG. 5 is a transverse sectional view substantially as seen in the direction of arrows from the line V—V in FIG. 4.

The mode of operation of the damper 210 which is shown in FIGS. 4 and 5 is determined by a pair of arcuate masses 215 in conjunction with pairs of compression springs 218 each of which is shown as constituting a relatively short coil spring. The masses 215 and the associated pairs of coil springs 218 are confined in an arcuate housing or casing 230. The casing 230 of the damper 210 which is shown in FIGS. 4 and 5 is a one-piece metallic body having two arcuate chambers 231 each of which movably receives one of the masses 215 and the corresponding pair of coil springs 218. The chambers 231 are open at both axial ends of the casing 230 (see FIG. 4) and their centers of curvature are preferably located on the axis of the crankshaft 203 which is rotatably journalled in the housing (not shown) of the piston engine embodying the crankshaft 203 and the vibration damper 210.

The illustrated masses 215 are relatively thick (as measured in the axial direction of the crankshaft 203) and can be made of a sintered metallic material. When the crankshaft 203 rotates (i.e., when the piston engine is on), the masses 215 tend to move radially outwardly under the action of centrifugal force and to frictionally engage the concave internal surfaces of the arcuate walls 232 forming part of the casing 230 and bounding the radially outermost portions of the respective arcuate chambers 231. The extent of frictional engagement (and more specifically the magnitude of the frictional force which develops between any one of the masses 215 and the respective wall 232 is a function of the RPM of the crankshaft 203 (i.e., of the damper 210).

The magnitude of the just mentioned force is further dependent upon the prestressing and actual stressing of the pairs of coil springs 218 which react against radially extending portions of the casing 230 and bear against the end portions of the respective masses 215 (this can be readily seen in FIG. 5). The initial stressing of the coil springs 218 is preferably selected in such a way that one coil spring of each pair continues to store some energy when the other spring of the respective pair is under maximum compression (i.e., when the convolutions of the other spring abut each other and cause the spring to act as a solid block). This ensures that the coil springs 218 remain in optimum positions relative to the respective masses 215 and relative to the casing 230, not only as seen in the axial direction but also as seen in the circumferential direction of the casing. The latter constitutes the input element of the damper 210 and is fixedly secured to one of the two cheeks 205 shown in FIG. 4.

Another advantage of coil springs 218 which are prestressed during each stage of operation of the piston engine (as well as when the engine is turned off) is that each of the masses 215 is invariably held in the respective chamber 231 without any play or without a play which could adversely affect the operation of the damper 210.

The parameters of the coil springs 218 and of the masses 215 are preferably selected in such a way that the damping frequency of the damper 210 is properly related to the characteristic frequency of the crankshaft 203. The ends of the chambers 231 (as seen in the axial direction of the crankshaft 203) are sealed by suitable lids 233. The lids 233, 234 which are shown in FIG. 4 are arcuate parts made of sheet metal; such lids are secured to the casing by bonding (such as welding), by rivets and/or other types of fasteners and/or by calking.

As can be readily seen in FIG. 5, the casing (input element) 230 of the damper 210 is substantially U-shaped (this casing actually resembles a saddle or a horseshoe) and surrounds a major portion of the respective cheek 205. The casing 230 can be slipped onto the left-hand cheek 205 of FIG. 4 in a direction to the right, i.e., toward the illustrated crankpin 204. When the mounting of the casing 230 on the respective cheek 205 is completed, two parallel legs 235, 236 of the casing (such legs extend transversely of the axis of the crankshaft 203 and in a direction away from the chambers 231) are closely adjacent two parallel sides of the cheek 205 and are affixed to the cheek (i.e., to the crankshaft 203) by bolts 237 or any other suitable fasteners. The axes of the properly mounted fasteners preferably intersect or are very close to the axis of the illustrated crankpin 204.

When the masses 215 are in frictional engagement with the respective outer walls 232 of the casing 230 under the action of centrifugal force, these masses operate in parallel with the coil springs 218.

At least one of the chambers 231 can communicate with the interior of the housing for the crankshaft 203 by way of one or more channels (not specifically shown) so that it can receive some of the lubricant which serves to lubricate and remove heat from the bearings for the crankpin(s) 204 and/or end portions of the crankshaft. In addition, the passage or passages for the flow of lubricant (e.g., oil) into and from one or more chambers 231 can be dimensioned in such a way that they cause the development of an additional damping action, namely an action which assists the damping action furnished by the masses 215 and coil springs 218. This even further reduces the likelihood of the development of harmonic vibrations.

Additional damping action can be achieved by resorting to one or two energy storing members corresponding to the diaphragm spring 26 shown in FIG. 1. For example, one such diaphragm spring can be inserted (in prestressed condition) between the masses 215 and the lid 233, and another diaphragm spring can be installed between the masses 215 and the lid 234. The diaphragm spring(s) can be utilized alone or with one or more suitably stressed leaf springs, or such diaphragm spring(s) can be replaced by leaf springs.

FIG. 5 shows by broken lines a coil spring 241 which reacts against the inner side of the respective wall 232 and bears upon the surface at the bottom of a radially outwardly widening recess or socket 240 in the convex radially outer surface of the respective mass 215. The purpose of the coil spring 241 is to bias the respective mass 215 radially inwardly in the respective chamber 231, i.e., counter to the bias of the respective pair of coil springs 218 and counter to the action of centrifugal force which develops when the casing 230 is caused to rotate with the crankshaft 203, i.e., when the piston engine is on. An important advantage of the coil spring 241 (or an equivalent biasing means) is that, by properly selecting the initial bias of the spring 241, one can select that rotational speed of the crankshaft 203 at which the centrifugal force acting upon the mass 215 which is biased by the spring 241 overcomes the bias of the spring 241 and compels the convex radially outer surface of the mass 215 to frictionally engage the complementary concave internal surface of the respective wall 232. The bias of the spring 241 can be selected in such a way that, when the piston engine embodying the structure of FIGS. 4 and 5 is idle, or when the RPM of the crankshaft 203 is below a predetermined threshold value, the spring 241 can bias the concave radially inner surface of the respective mass 215 into frictional engagement with the convex external surface of the arcuate radially inner wall 242 of the casing 230.

It is clear that the dimensions and bias of the coil spring 241 as well as the dimensions and configuration of the recess 240 must be selected with a view to ensure that the surfaces bounding the recess 240 do not prevent the spring 241 from assuming (inclined) positions corresponding to the end positions of the corresponding mass 215 in the respective chamber 231.

For example, the initial bias of the spring 241 can be related to the bulk of the mass 215 and to the initial bias of the respective coil springs 218 in such a way that, when the RPM of the crankshaft 203 is relatively low, the mass 215 does not contact the walls 232 and 242 of the casing 230 or is in negligible or relatively weak frictional engagement with one of the walls 232, 242. Furthermore, the initial bias of the spring 241 can be such that, when the action of centrifugal force upon the mass 215 matches or closely approximates the action of the mass 215 upon the spring 241, frictional engagement between the mass and the casing 230 is nil or practically nil. Such state of equilibrium develops at a preselected RPM of the crankshaft 203, i.e., the damping action which develops as a result of frictional engagement of the mass 215 with the casing 230 can be varied (determined in advance) by the simple expedient of properly selecting the initial bias or prestressing of the spring 241. The initial bias of the spring 241 can be selected with a view to ensure that the force applied to the mass 215 by this spring and the centrifugal force acting upon the mass balance each other within a certain range of rotational speeds of the crankshaft 203. If the RPM drops below the lower limit of such range, the frictional engagement between the mass and the casing 230 can be further reduced, and the frictional engagement can increase (or can begin to be effective) if the RPM of the crankshaft rises above the upper limit of the range.

It is further clear that a spring 241 (or one or more equivalent resilient biasing means) can be provided for each mass 215 of the damper 210. Moreover, though FIG. 4 shows a damper 210 on only one of the two illustrated cheeks 205 of the crankshaft 203, each of these cheeks can carry a discrete damper, and the two dampers may but need not be identical.

If the crankshaft 210 of FIGS. 4 and 5 comprises two or more crankpins 204 (depending on the number of pistons in the engine), two or more dampers 210 or equivalent dampers can be distributed in the axial direction of the crankshaft, depending on the desired overall damping action and on the damping capacity of individual dampers. Moreover, the distribution of the dampers in the axial direction of the crankshaft can be further selected with a view to prevent or to at least reduce any unbalance of the crankshaft. This reduces the likelihood of extensive wear upon the radial and/or axial bearings for the crankshaft The structure shown in the lower right-hand corner of FIG. 4 is to represent a damper which may but need not be identical with the damper 210. Alternatively, or in addition to its vibration damping action, such structure can act as a counterweight which opposes or prevents an imbalance of the crankshaft.

Figure 5A:
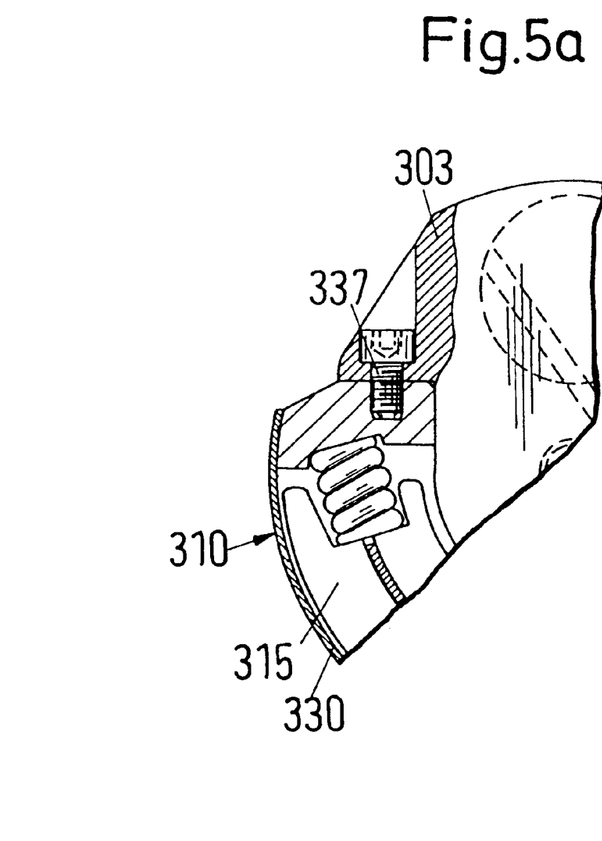
FIG. 5a is a fragmentary transverse sectional view showing a modification of the crankshaft-damper combination which is illustrated in FIGS. 4 and 5.

FIG. 5a shows a portion of a crankshaft 303 and a portion of a casing 330 constituting a modification of the one-piece casing 230 forming part of the damper 210 shown in FIGS. 4 and 5. The casing 330 is assembled of several sections or parts which must be secured (e.g., welded) to each other in order to establish a solid and long-lasting chambered receptacle for masses 315 (only one shown in FIG. 5a) and associated pairs of coil springs corresponding to the coil springs 218 shown in FIGS. 4 and 5.

The connection between the composite casing 330 and the crankshaft 303 comprises threaded fasteners 337 (only one shown in FIG. 5a) which are normal to but do not intersect the axis of the crankpin (indicated in FIG. 5a by broken lines). In contrast to the fasteners 237 of FIG. 5 (these fasteners are subjected to shearing stesses), the fasteners including the fastener 337 actually shown in FIG. 5a are subjected to axial stresses.

As already mentioned in connection with the description of the piston engine including the structure of FIGS. 4 and 5, the casing 230 constitutes the input element of the damper 210. However, and since the casing 230 is fixedly secured to one of the cheeks 205, such cheek also forms part of the input element of the damper 210. The same holds true for the casing 330 of the damper shown in FIG. 5a. In other words, the damper 210 (as well as the damper 310 including the structure of FIG. 5a) is directly incorporated into the respective crankshaft (203 in FIGS. 4 and 5). It can be said that the crankshaft 203 and the damper 210 constitute two components of a module which can be assembled preparatory to incorporation of such module into the housing 202 of the piston engine. Save for the feature that it comprises a composite housing, the damper 310 of FIG. 5a is assumed to be identical with or clearly analogous to the damper 210, i.e., one cheek of the crankshaft 303 can be said to form part of the input element of the damper 310, and this damper can be assembled with the crankshaft 303 before the thus obtained module is installed in the housing of the piston engine.

The situation is somewhat different in the embodiments of FIGS. 1–2 and 3 because the dampers 10 and 110 are not mounted on or integrated into the adjacent cheeks but are affixed to the snouts (6 and 106) of the respective crankshafts 3 and 103.

Figure 6:
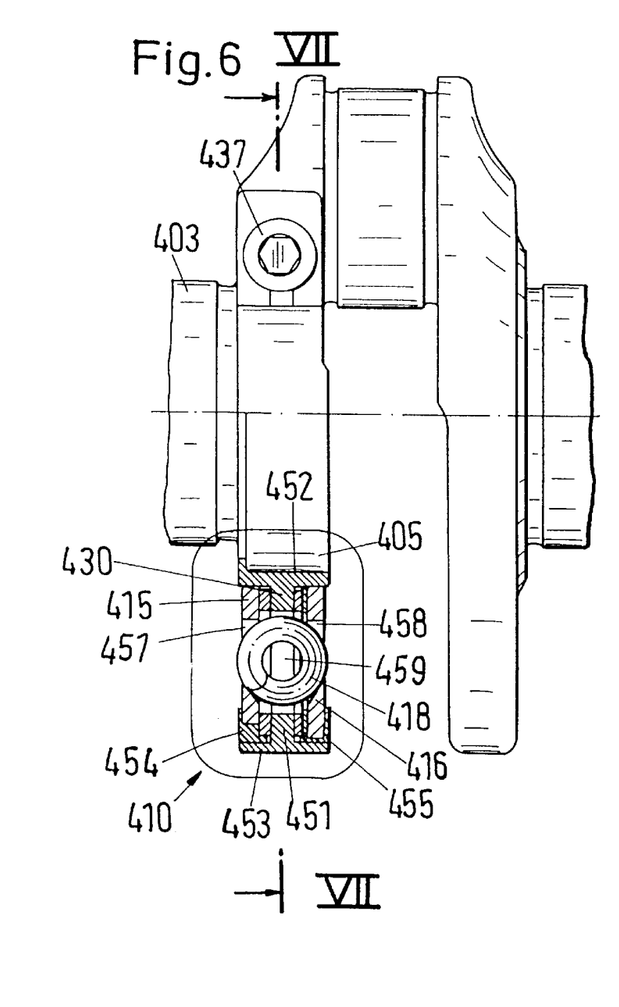
FIG. 6 is a view similar to that of FIG. 4 but showing a different combination of a cheek and a vibration damper.
Figure 7:
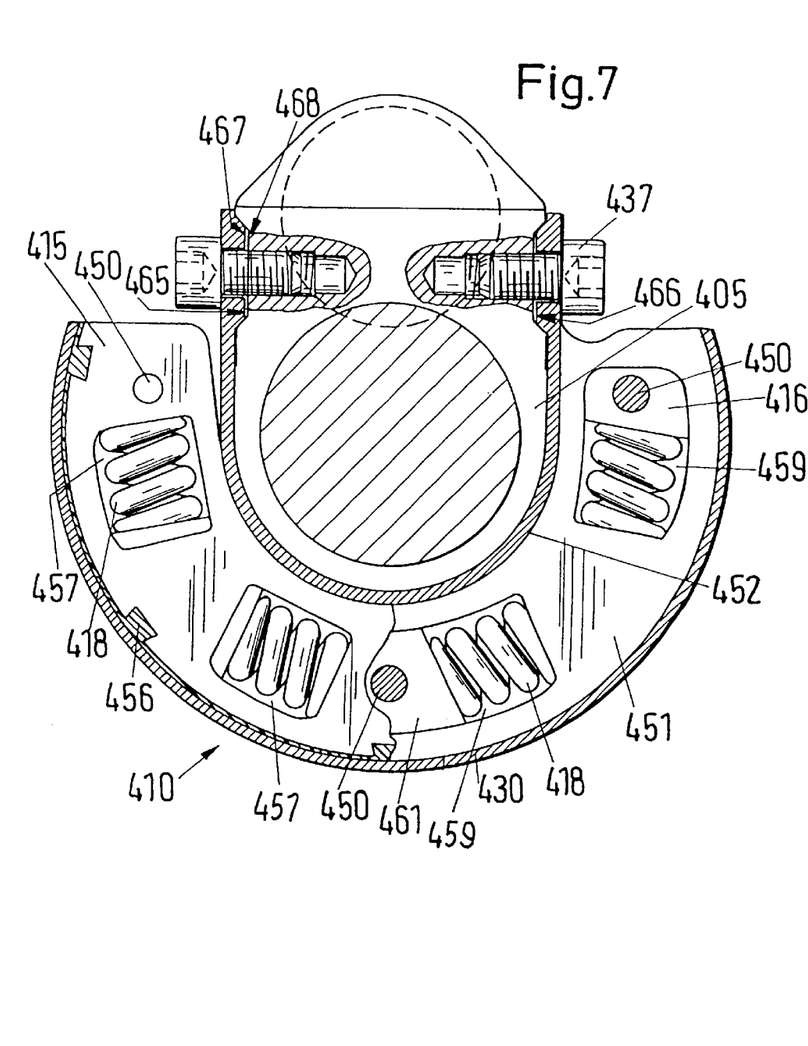
FIG. 7 is a transverse sectional view substantially as seen in the direction of arrows from the line VII—VII of FIG. 6.
Figure 8:
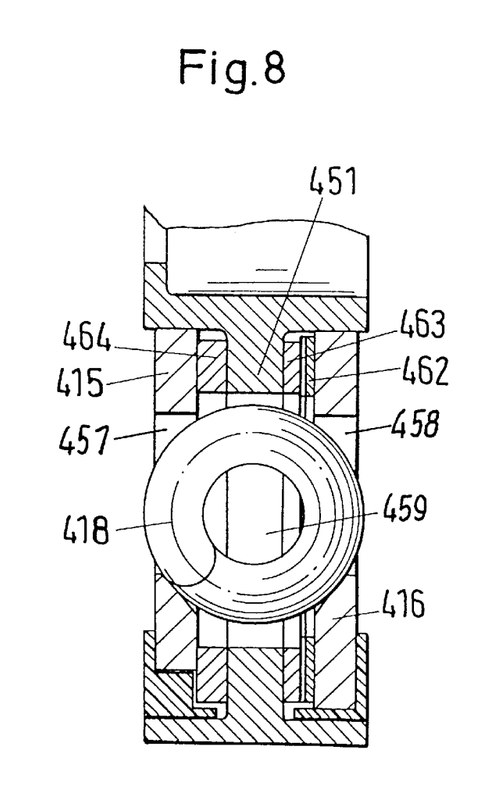
FIG. 8 is an enlarged view of a detail of the structure which is shown in FIG. 6.

FIGS. 6, 7 and 8 illustrate the details of an additional damper 410 which constitutes a second modification of the damper 210 of FIGS. 4 and 5. As can be readily seen in FIG. 7, the casing 430 of the damper 410 has a substantially U-shaped cross-sectional outline, and each of FIGS. 6 and 7 shows that the casing 430 surrounds a substantial portion of one cheek 405 of the crankshaft 403. The orientation of the threaded fasteners 437 (shown in FIGS. 6 and 7) which serve to fixedly secure the casing 430 to the respective cheek 405 is similar to that of the fasteners 237 shown in FIG. 5.

FIG. 6 shows that the non-referenced right-hand cheek of the crankshaft 403 is larger than the left-hand cheek 405. The reason is that the left-hand cheek 405 is smaller on purpose in order to provide room for the casing 430 of the damper 410. In other words, it can be stated that the damper 410 forms part of the respective cheek 405 or that this cheek forms part of the damper 410.

The mass of the damper 410 is composed of two identical or similar flat arcuate parts 415, 416 which are located at opposite sides of a centrally located flange or web 451 of the casing 430 (i.e., of a portion of the input element of the damper 410). The discs 415, 416 are non-rotatably connected to and spaced apart from each other by a set of axially parallel rivets 450. These rivets can be replaced by threaded fasteners, or the discs 415, 416 can be welded or otherwise bonded to each other. If the discs 415, 416 are to be welded to each other, at least one of these discs can be provided with axially parallel lugs which are bonded to the other disc.

The web 451 has an arcuate shape and resembles a portion of a flat washer which extends radially of the axis of the crankshaft 403 between a trough-shaped inner wall 452 and a trough-shaped outer wall 453 of the casing 430. The web 451 and the walls 452, 453 define two arcuate pockets which are located at the opposite sides of the web 451, which can have the same depth (as measured axially of the crankshaft 403), one of which receives the disc 415, and the other of which receives the disc 416 of the mass of the damper 410. The dimensions of the just mentioned pockets and of the discs 415, 416 are or can be selected in such a way that each of the two discs is fully (see FIG. 6) or only partially confined or received in the respective pocket.

When the crankshaft 403 is caused to rotate, the discs 415, 416 tend to move radially outwardly toward the inner side of the wall 453 at the respective sides of the web 451. However, the arrangement is such that the convex external surfaces of the discs 415, 416 cannot bear directly upon the inner side of the wall 453 because the damper 410 further comprises two arcuate bearing inserts or shoes 454, 455 one of which is located at the periphery of the disc 415 at one side of the web 451 and the other of which is located at the periphery of the disc 416 at the other side of the web 451. The shoes 454, 455 are or can be made of a material which is resistant to wear and can be readily finished to contact the respective disc 415 or 416 or the respective portion of the internal surface of the wall 453 with a minimum of friction. In the embodiment of FIGS. 6 to 8, the shoes 454 and 455 are respectively secured to the radially outermost portions of the discs 415 and 416 by dovetailed connectors 456. Other types of form-locking connections between the shoes 454, 455 and the respective discs 415, 416 can be utilized with equal or similar advantage. It is also possible to calk or bond (e.g., weld or glue) the shoes 454, 455 to the peripheries of the respective discs 415, 416.

The damper 410 further comprises energy storing elements 418 in the form of coil springs each of which is received in a window 457 of the disc 415, in a window 459 of the web 451 and in a window 458 of the disc 416. The configuration of the surfaces bounding the windows 457, 458, 459 is preferably selected in such a way that the coil springs 418 are held against any undue movement in the radial as well as in the axial direction of the crankshaft 403.

The lengths of the coil springs 418 as well as the dimensions of the windows 457, 458 relative to the dimensions of the windows 459 are preferably selected in such a way that at least the two outermost coil springs 418 (i.e., the coil springs adjacent to the two fasteners 437, as viewed in FIG. 7) are installed in a prestressed condition. The extent of initial stressing is preferably such that one of the two outermost springs 418 continues to store a certain amount of energy when the other outermost spring has already undergone a maximal (total) compression so that its convolutions abut each other and together form a solid block which cannot undergo any further compression. The advantages of such prestressing of at least some of the coil springs 418 are the same as or clearly analogous to those already described in connection with the coil springs 218 of the damper 210 shown in FIGS. 4 and 5.

It has been found that the damper 410 operates quite satisfactorily if the two neighboring centrally located coil springs 418 (such as the two lowermost springs 418 shown in FIG. 7) are also installed in a prestressed condition and actually bear against each other.

FIG. 7 shows that the median window 459 of the web 451 is longer (as seen in the circumferential direction of the casing 430) than the other two windows 459 (for the two upper springs 418, as viewed in FIG. 7) and receives portions of the two centrally located springs 418. The longer median window 459 of the web 451 is partially overlapped by radially extending portions 461 of the discs 415, 416. The portions 461 flank those portions of the two median coil springs 418 which abut each other in the longer window 459. Such mounting ensures that the two median coil springs 418 operate in series.

FIG. 8 shows a friction generating device including a corrugated spring 462 and a friction ring 463 installed between the web 451 and the disc (416. The spring 462 reacts against the discs 416 and urges the friction ring 463 against the adjacent side of the web 451. At the same time, the spring 462 pulls the disc 464 in a direction to the right, as viewed in FIG. 8, i.e., into frictional engagement with the adjacent side of the web 451. Actually, the spring 462 urges the disc 415 against the second friction disc 464 which, in turn, bears against the adjacent side of the web 451. The friction disc 463 and/or 464 can be omitted by increasing the thickness(es), of the disc 415 and/or 416.

The fasteners 437 serve as one of the means for securing the casing 430 to the respective cheek 405. In order to further reduce the likelihood of separation of the casing 430 from the crankshaft 403, particularly under the action of centrifugal force, the piston engine embodying the structure of FIGS. 6 to 8 further comprises two form-locking connections 465, 465 which are effective between the end portions of the inner wall 452 of the casing 430 and the adjacent portions of the cheek 405. Each of these form-locking connections comprises a prismatic male connector 467 at the respective end of the inner wall 452 and a complementary female connector 468 (in the form of a groove parallel to the axis of the crankshaft 403) in the cheek 405. It is clear that the male connectors can be provided on the cheek 405 and the female connectors are then provided in the casing 430, that one male connector can be provided on the casing 430 and the other male connector can be provided on the cheek 405, or that the form-locking connections 465, 466 can be replaced by or used jointly with other types of connections.

The casing 430 has a substantially U-shaped cross sectional outline, the same as the casing 230 of the damper 210, and can be made of a suitable metallic material.

Figure 9:
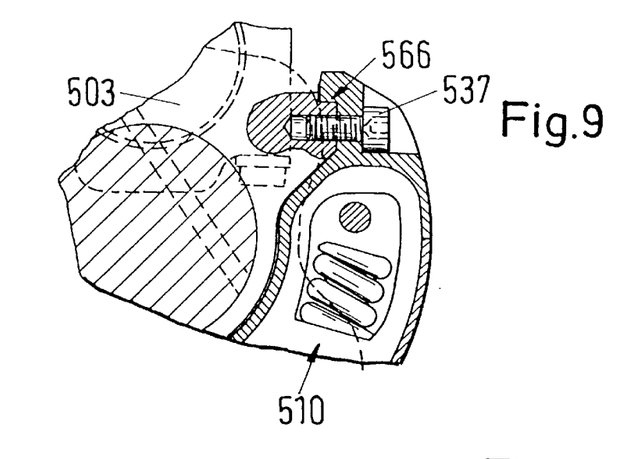
FIG. 9 is a fragmentary transverse sectional view of a crakshaft-damper combination which constitutes a first modification of the structure shown in FIGS. 6 to 8.

FIG. 9 illustrates a portion of a damper 510 and a portion of a crankshaft 503. In contrast to the form-locking connections 465, 466 of FIG. 7, the form-locking connection between the crankshaft 503 and the casing of the damper 510 comprises a male connector 566 which is provided on the cheek of the crankshaft and extends into a complementary female connector in the casing of the damper 510. In addition, the male connector 566 is bounded by at least two surfaces which make a right angle; this brings about the advantage that the centrifugal force which is opposed by such form-locking connections cannot act upon the shanks of the threaded fasteners 537 (only one shown in FIG. 9) which correspond to the fasteners 437 shown in FIG. 7. The form-locking connections (only one can be seen in FIG. 9) which include male connectors 566 establish a particularly firm mechanical bond between the casing of the damper 510 and the selected cheek of the crankshaft 503.

It is advisable to provide the improved damper with a lubricating system which ensures a positive (forced) circulation of oil or another suitable lubricant. Such lubricating system can constitute the lubricating system of the piston engine or a discrete lubricating system which is designed to lubricate only the component parts of the damper, namely the input element, the mass and the energy storing elements between the input element and the mass. For example, a discrete lubricating system for the damper can include an arrangement which injects lubricant into the damper.

Figure 10:
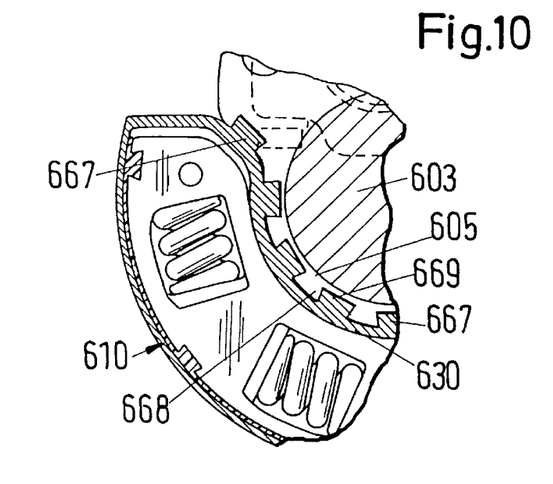
FIG. 10 is a similar fragmentary transverse sectional view of a second modification of the crankshaft-damper combination shown in FIGS. 6 to 8.

FIG. 10 illustrates a further damper 610 which is affixed to a cheek 605 of the crankshaft 603 by a mechanical connection 667 including mating axially parallel splines 668 and 669 provided on the cheek 605 and on the inner wall of the casing 630, respectively. The splines 668, 669 have substantially trapezoidal cross-sectional outlines.

It is possible to design the splines 668, 669 of the connection 667 in such a way that they taper in the axial direction of the crankshaft 603. This ensures that, once properly assembled, the connection 667 is automatically held against separation of its splines in one axial direction of the crankshaft. Uncontrolled movements in the opposite direction can be prevented by employing, for example, a split ring (not shown) which is carried by the crankshaft 603 and extends into a groove of the casing 630. Alternatively, the split ring or an analogous ring can be secured to the crankshaft 603 in such a way that it overlies the end faces at the larger ends of the splines 669 on the casing 630.

An additional important advantage of energy storing elements (such as the coil springs 418 of the damper 410 shown in FIGS. 6 to 8) which are installed in their casing (430 of the damper 410) or solely between the input element and the mass of the damper (reference may be had, for example, to the damper 10 of FIGS. 1 and 2) in prestressed condition is that such initial stressing of the energy storing elements compensates for eventual manufacturing tolerances and/or for wear upon the component parts of the damper. Thus, initial stressing ensures that the characteristic curve of the damper is predictable (i.e., it follows a preselected optimum pattern) during each stage of angular displacement of the input element and the mass relative to each other; this includes the initial stage when the input element and/or the mass is caused to turn from a starting or zero position, and this also embraces angular displacements of the input element and the mass relative to each other after the energy storing elements and/or the surfaces surrounding the windows for the energy storing elements have undergone at least a certain amount of wear. Otherwise stated, initial stressing of the energy storing elements of the damper ensures that the spring constant remains unchanged and that the damping frequency also remains at least substantially constant during the useful life of the damper.

Another important advantage of the improved damper is that it can be readily installed in piston engines of known design upon relatively small alterations of the housing (FIGS. 1–3) or a cheek (FIGS. 4–10). For example, each of the casings shown in FIGS. 4 to 10 can be mounted on its crankshaft by the simple expedient of slipping it onto the selected cheek in the axial direction of the crankshaft. This simplifies and reduces the cost of assembly of the damper with the crankshaft and the cost of installing the crankshaft in the housing of the engine.

As already mentioned hereinbefore, the improved damper can serve the additional purpose of acting as a counterweight for the crankshaft. Such function can be performed with particular advantage by a damper which is mounted on a cheek of the crankshaft, especially on a cheek flanking the first crankpin.

As also mentioned hereinbefore, it might be desirable to provide a crankshaft with two or even more dampers. For example, the crankshaft 3 of FIGS. 1 and 2 can cooperate with two dampers, namely the illustrated damper 10 which is affixed to the snout 6 and a second damper (not shown) which is mounted on the main bearing journal at the other axial end of the crankshaft 3. It is equally possible to employ the damper 10 (which is mounted on the snout 6) with a second damper which is mounted on one of the cheeks 5 forming part of the crankshaft 3.

It is also within the purview of the invention to mount the damper (or one of two or more dampers) on the crankshaft in such a way that a torque limiting device determines the magnitude of torque which can be transmitted between the crankshaft and the input element of the damper. For example, one can employ a suitable slip clutch which operates between the input element of the damper and an adjacent portion of the crankshaft.

The making of at least some of the constituents of the improved damper from a metallic sheet material is desirable in many instances because this contributes to lower cost of the damper. For example, the parts 11, 16 and 17 of the damper 10 can be made of sheet metal. The making of the parts 16, 17 involves simple stamping, and the making of the part 11 involves a stamping operation followed by an embossing or an analogous deforming operation to form the cupped portion 21.

The frictional damping device 25 of the piston engine 1 shown in FIGS. 1 and 2 can be designed to be effective during each and every stage of angular movement of the input element 11 and the mass 15 relative to each other. However, it is also possible to employ a friction generating device which operates with a certain delay, particularly when the direction of angular movement of the input element relative to the mass (or vice versa) is reversed. Thus, and referring again to FIGS. 1–2, the frictional damping device 25 can be designed in such a way that it becomes active after the input element 11 has completed a certain angular movement (relative to the mass 15) from a starting or neutral position, or after the input element 11 has reversed the direction of its movement so that the initial stage of such angular movement in the newly selected direction takes place relative to the mass 15. The same can apply for movements of the mass 15 relative to the input element It is further possible to equip a damper with several frictional damping devices, e.g., with a device (such as 25) which is active whenever one of the parts 11, 15 turns or tends to turn relative to the other of these parts, and with a device which becomes effective only after one of the parts 11, 15 has already completed a predetermined angular movement relative to the other of these parts. This holds true regardless of whether the improved vibration damper is mounted adjacent to one of the cheeks forming part of a crankshaft, or is mounted on (so that it surrounds a portion of) a cheek, or is designed in such a way that it forms part of a cheek or that the cheek is a component part of the improved vibration damper.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of vibration dampers for the crankshafts of piston engines and, therefore, such adaptations should and are intended to be comprehended within the meaning and range of equivalence of the appended claims.

What is claimed is:

1. In a piston engine, a combination comprising a housing; a crankshaft journalled in said housing for rotation about a predetermined axis; and means for damping vibrations of said crankshaft in said housing, said damping means being at least partially confined in said housing and including at least two components movable relative to each other and relative to said axis, and resilient means including at least one energy storing element arranged to oppose movements of said components relative to each other and movements of at least one of said components relative to said axis, said components and said resilient means forming part of a module provided on said crankshaft.

2. The combination of claim 1, wherein said damping means is fully confined in said housing.

3. The combination of claim 1, wherein one of said components comprises a rotary input element and another of said components comprises at least one rotary inertia-enhancing mass, said input element and said at least one mass being rotatable relative to each other and said resilient means being interposed between said input element and said at least one mass to oppose rotation of said input element and said at least one mass relative to each other.

4. The combination of claim 3, wherein said energy storing resilient means comprises at least one coil spring.

5. The combination of claim 3, further comprising at least one friction generating device arranged to oppose at least certain stages of rotation of said input element and said at least one mass relative to each other.

6. The combination of claim 1, wherein one of said components comprises a rotary input element and another of said components comprises at least one rotary inertia-enhancing mass, said input element and said at least one mass being rotatable relative to each other and said damping means further comprising at least one friction generating device arranged to oppose rotation of said input element and said at least one mass relative to each other.

7. The combination of claim 1, wherein said crankshaft has at least one cheek and said damping means is provided on said at least one cheek.

8. The apparatus of claim 1, wherein said crankshaft comprises at least one cheek, said damping means being adjacent said at least one cheek as seen in the direction of said axis.

9. The combination of claim 1, wherein said crankshaft includes a portion which is rotatable about said predetermined axis and said damping means is a ring concentric with said portion of said crankshaft.

10. The combination of claim 9, wherein said portion of said crankshaft is a snout.

11. The combination of claim 1, wherein said crankshaft comprises at least one cheek, said housing including a wall spaced apart from said at least one cheek in the direction of said axis and said damping means being disposed between said wall and said at least one cheek.

12. The combination of claim 11, wherein said crankshaft further comprises a portion which is rotatably mounted in said wall.

13. The combination of claim 1, wherein said crankshaft comprises a snout, said damping means being mounted on said snout.

14. The combination of claim 1, wherein said first component includes an input element rotatable with said crankshaft.

15. The combination of claim 14, wherein said input element is affixed to said crankshaft.

16. The combination of claim 1, wherein said first component comprises an input element arranged to receive torque from said crankshaft, and further comprising means for limiting the magnitude of torque which said crankshaft can transmit to said input element.

17. The combination of claim 16, wherein said means for limiting the magnitude of torque comprises a slip clutch.

18. The combination of claim 1, wherein said first component comprises a rotary annular input element having first and second sides, said second component comprising a rotary mass adjacent at least one of said sides as seen in the direction of said axis, said mass and said input element being rotatable relative to each other about said axis and said damping means further comprising at least one resilient energy storing element arranged to yieldably oppose rotation of said input element and said mass relative to each other, and at least one friction generating device operating between said input element and said mass.

19. The combination of claim 18, wherein said friction generating device is arranged to operate in parallel with said at least one energy storing element.

20. The combination of claim 1, wherein said first component comprises a composite mass and said second component comprises an annular input element flanked at least in part by two portions of said composite mass, said portions of said mass being rotatable relative to said input element and being spaced apart from each other in the direction of said axis, said at least one resilient energy storing element being disposed in windows provided therefor in said input element and at least one of said portions of said mass to oppose rotation of said input element and said at least one portion of said mass relative to each other.

21. The combination of claim 20, wherein said damping means further comprises means for non-rotatably connecting said portions of said mass to each other.

22. The combination of claim 20, wherein said at least one energy storing element comprises a coil spring and said at least one portion of said mass has an annular shape.

23. The combination of claim 20, further comprising a friction generating device arranged to oppose rotation of said mass and said input element relative to each other.

24. The combination of claim 23, wherein said friction generating device comprises at least one energy storing member reacting against one of said input element and said mass and bearing against the other of said input element and said mass.

25. The combination of claim 1, wherein said crankshaft includes an end portion, said first component comprising an input element rotatable with said crankshaft about said axis and said second component comprising a mass rotatable about said axis relative to said input element, said input element having a tubular extension arranged to at least partially surround said end portion of said crankshaft.

26. The combination of claim 25, wherein said at least one resilient energy storing element is disposed at a first radial distance from said axis and said extension is disposed at a second radial distance from said axis less than said first radial distance.

27. In a piston engine, a combination comprising a housing; a crankshaft journalled in said housing, being rotatable relative to said housing about a predetermined axis and including an end portion; and means for damping vibrations of said crankshaft in said housing, said damping means being at least partially confined in said housing, being provided on said crankshaft and comprising an input element rotatable with said crankshaft about said axis, a mass rotatable about said axis relative to said input element, and at least one resilient energy storing element arranged to oppose rotation of said input element and said mass relative to each other, said input element having a tubular extension at least partially surrounding said end portion of said crankshaft, being mounted in said housing and constituting a radial bearing for said end portion of said crankshaft.

28. The combination of claim 27, wherein said extension of said input element and said end portion of said crankshaft cooperate to provide a thrust bearing for said crankshaft.

29. A vibration damper for use in a piston engine having a housing and a crankshaft, said crankshaft being rotatable in said housing about a predetermined axis and said damper comprising at least two components movable relative to each other against the opposition of at least one resilient element, said resilient element being disposed between said at least two components and forming part of a module further comprising said at least two components and being arranged to be mounted on said crankshaft in a position such that the module is confined in said housing upon mounting of said crankshaft in said housing.

30. The structure of claim 29, wherein the damper further comprises a portion surrounding an end portion of the crankshaft when the module is mounted on the crankshaft.

31. The structure of claim 29, wherein one of said at least two components includes an input element and the other of said at least two components includes an output element of said damper, said input and output elements being immediately adjacent a cheek of the crankshaft when said module is mounted on the crankshaft.

32. The structure of claim 29, wherein the crankshaft has a cheek constituted by the vibration damper.

33. The structure of claim 29, wherein the crankshaft has a cheek constituted in part by the vibration damper.

34. The structure of claim 29, wherein the damper is substantially U-shaped.

35. The structure of claim 29, wherein the damper is horseshoe-shaped.

36. The structure of claim 29, wherein the crankshaft of said module is rotatable relative to the housing about a predetermined axis and comprises a cheek and an oval portion adjacent the cheek, extending radially of said axis and flanked by two surfaces at least substantially normal to said axis, said damper having a substantially U-shaped outline, surrounding said oval portion and including two legs at least partially abutting said cheek.

37. The structure of claim 36, further comprising fastener means connecting said legs to said cheek.

38. A method of assembling a piston engine wherein a crankshaft is rotatable in a housing and has a tendency to perform at times harmonic vibrations in actual use of the engine, comprising the steps of assembling the crankshaft with a module including at least one vibration damper having at least two components movable relative to each other against the opposition of at least one energy storing means disposed between said at least two components; and thereupon rotatably mounting the crankshaft in the housing.

39. The method of claim 38, wherein said assembling step includes incorporating the at least one vibration damper into a cheek of the crankshaft.

40. The method of claim 38, wherein said assembling step includes combining the crankshaft with a plurality of vibration dampers.

41. A vibration damper for use in a piston engine having a housing and a crankshaft mounted in said housing for rotation about a predetermined axis, said damper being arranged to be mounted on said crankshaft prior to mounting said crankshaft in said housing and comprising at least two components movable relative to each other, friction generating means arranged to oppose movements of said components relative to each other, and energy storing means disposed between and arranged to oppose movements of said components relative to each other, said energy storing means being positioned to apply to said friction generating means a force which entails the generation of a frictional damping action at least when said at least two components are caused to move relative to each other.

* * * * *